US006865176B2

United States Patent
Averbuch et al.

(10) Patent No.: US 6,865,176 B2
(45) Date of Patent: Mar. 8, 2005

(54) METHOD AND APPARATUS FOR RESOLVING HALF DUPLEX MESSAGE COLLISIONS

(75) Inventors: Rod Averbuch, Buffalo Grove, IL (US); Richard Lee Van Egeren, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 848 days.

(21) Appl. No.: 09/877,587

(22) Filed: Jun. 8, 2001

(65) Prior Publication Data

US 2002/0186678 A1 Dec. 12, 2002

(51) Int. Cl.⁷ .................................................. H04J 3/24
(52) U.S. Cl. ...................... 370/348; 370/336; 370/349; 370/442; 370/280
(58) Field of Search .................. 370/328, 329, 370/330, 336, 337, 345, 346, 347, 348, 349, 442, 468, 277, 280

(56) References Cited

U.S. PATENT DOCUMENTS 5,949,768 A * 9/1999 Citta et al. ................. 370/322
5,966,378 A * 10/1999 Hamalainen ................ 370/348
6,269,088 B1 * 7/2001 Masui et al. ................ 370/335
6,393,013 B1 * 5/2002 Masui et al. ................ 370/346

* cited by examiner

Primary Examiner—Bob A. Phunkulh

(57) ABSTRACT

A method and apparatus resolves message collisions in wireless TDMA packet systems for subscribers that communicate in half duplex modes. In one embodiment, a wireless TDMA network element (100) includes at least one processing device (104) and memory (106), operatively coupled to the processing device (104). The processing device (104) divides an outbound message (300) designated for a first subscriber and produces therefrom an independent first message portion (such as an independent short message) (302) and an independent second message portion (such as an independent longer remaining message) (304). Each of the independent first and second message portions (302,304) are allocated to two different wireless outbound reservations for a common subscriber. The independent first message (302) is transmitted first. If a collision is detected, the wireless network element (100) avoids sending the independent second portion (304) to the first subscriber, otherwise the independent second message portion (304) is subsequently sent.

19 Claims, 5 Drawing Sheets

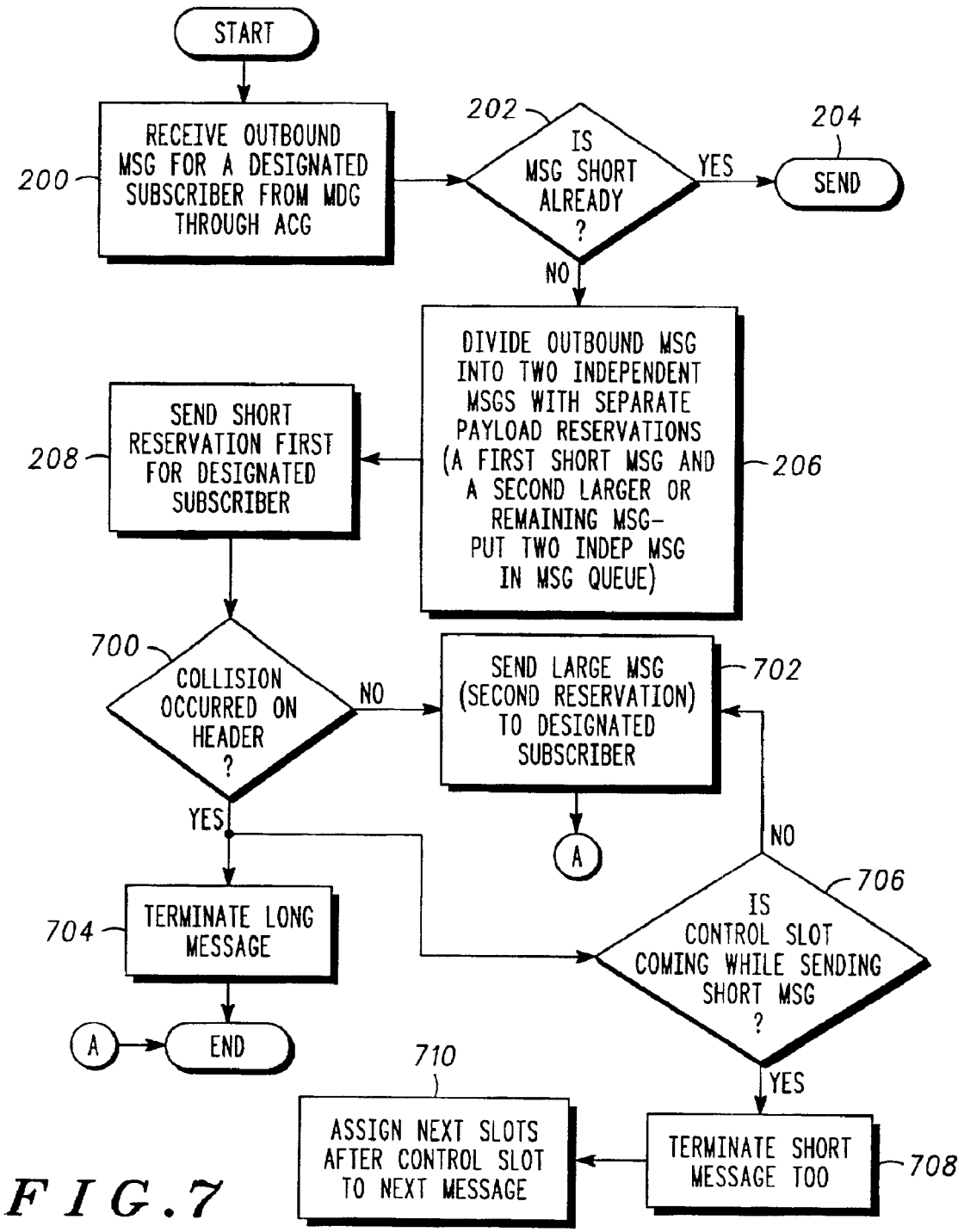

METHOD AND APPARATUS FOR RESOLVING HALF DUPLEX MESSAGE COLLISIONS

FIELD OF THE INVENTION

The invention relates generally to wireless apparatus and methods and more particularly to wireless methods and apparatus for resolving a message collision for a message transmitted over a wireless TDMA packet channel for a wireless unit communicating in a half duplex mode.

BACKGROUND OF THE INVENTION

Wireless time division multiple access (TDMA) systems are known, such as Group Speciale Mobile (GSM), TETRA and dispatch systems such as iDEN. Such dispatch systems communicate packet data as well as dispatch information such as voice information via shared channels that are shared by a number of wireless units referred to herein as subscribers. With TDMA wireless communication systems that employ subscribers with half duplex transceivers, the subscriber device needs to switch between outbound and inbound traffic because such devices cannot transmit and receive at the same time. The protocol used in such TDMA systems have different slotting protocols for audio information, for example, versus packet data. Typically, a wireless network element will allocate slots for a given subscriber to accommodate a real time voice communication such as a voice dispatch and allocate remaining slots to the extent available, for packet data. Such protocols, as known in the art, also use one or more control slots which are detected by all subscribers. For example, a subscriber may turn off to save battery life during slots that are not assigned to that particular subscriber, but "wake up" to receive the control slots to facilitate further communication or control desired by the system. The control slots may be used, for example, to indicate to a specified subscriber which upcoming remaining slots are to be used as packet data. Such control slots, for example, may be a type of a map identifying for the various channels, which of the TDAM slots in the next packet data frame are allocated for voice versus packet data, for example. This dynamic channel allocation allocates left over slots for data after voice information is taken care of to provide an efficient use of air resources. As also known in the art, a subscriber typically requests a reservation for an inbound channel so that it can transmit to the wireless network element, such as a base radio in an iDEN system. The network element provides the reservations based on a reservation request. Base radios may be operatively coupled to access controller gateways (ACG's) that allocate radio resources for calls and allocate unused slots for allocation as packet channels. The access controller gateway may be coupled to the Internet or any other suitable network via a mobile data gateway (MDG). The access controller gateway and any plurality of base radios typically form a site enhanced base transceiver system that may also include, for example, a dispatch application processor that selects a voice channel for a dispatch communication. In addition, outbound reservations are made by the base radios, for example, to allow outbound communication from the base radio to a subscriber.

In the outbound direction, one channel is typically allocated to serve the subscriber population in a specific cell. Outbound packets are fragmented into a sequence of slot blocks with the first block indicating the destination subscriber. A portion of the outbound channel is reserved for, and ultimately accommodates, the outbound transmission of the message. For battery saving purposes, all other subscribers will either sleep or monitor neighbor cells for the advertised duration of the new outbound reservation with one exception. All subscribers in an active session with fixed network equipment (FNE) must wake up or return to the packet channel to periodically monitor control slots (also referred to as a dynamic channel allocation protocol (DCAP) slots) and additionally to monitor header blocks as outbound message lengths dictate.

On the inbound side, an inbound channel is typically in one of two modes. In the random mode, subscribers can request an inbound reservation for as many as 81 slots, for example. In addition, a reserve mode can be used wherein a single subscriber may reserve the inbound channel and has exclusive use of it for transmitting an inbound message. While the inbound channel is reserved, all subscribers wishing to make an inbound reservation request must refrain from doing so until the inbound mode reverts back to the random access mode for that channel.

A problem arises with wireless subscribers that communicate in a half duplex mode since in some instances, a message collision can occur wherein a subscriber that is the intended target of an outbound message will transmit an inbound reservation request at the same time that the network element begins transmitting the outbound message based on an outbound reservation. For example, a network element may be sending information in an outbound slot but if it receives an inbound reservation request on the slot sent at the same time the outbound slot was sent for the same subscriber, a collision can occur. If a collision occurs, and a subscriber misses a header of a long message, the entire message is lost since the header includes the requisite information indicating which subscriber the message is intended for and the length of the message. A subscriber is typically unable to obtain identification information in the middle of a message. Subscribers typically wake up to listen to header blocks of a message and turn off during the rest of the message blocks if it is determined that the message is not intended for them. In addition, subscribers wake up for the control slot information as well.

Some systems have attempted to overcome collisions by defining certain slots to allow reservation requests. Hence no collisions typically occur since the network element can predict when a reservation may occur for a given subscriber. However, such a solution typically introduces a delay in the inbound message since the subscriber has to wait to send the inbound message until after the designated reservation request slot is available. Delays may also occur in the outbound mode since the network element has to wait to send an outbound message to make sure it is not sending at a time slot that has been allocated for a reservation request.

Other systems attempt to detect collisions and simply resend the message and effectively ignore the collision. This can waste substantial amounts of bandwidth since the transmission is not terminated.

Accordingly, a need exists for a method and apparatus that suitably accommodates and improves performance when a half duplex collision is detected.

BRIEF DESCRIPTION OF THE DRAWINGS

FIG. 6 is a diagram illustrating a control slot containing collision detection data in accordance with one embodiment of the invention; and FIG. 7 is a flow chart illustrating a method for resolving a message collision employing a combination of the methodology shown in FIGS. 2 and 5.

DETAILED DESCRIPTION OF A PREFERRED EMBODIMENT OF THE INVENTION

Figure 1:
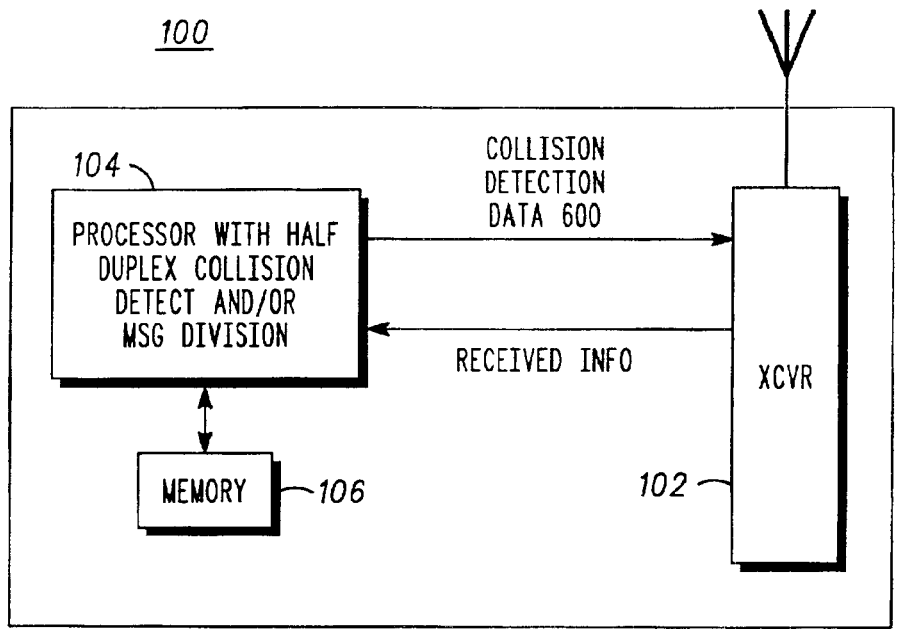
FIG. 1 illustrates one example of a wireless TDMA network element for resolving a message collision in accordance with one embodiment of the invention.

Briefly, a method and apparatus resolves message collisions in wireless TDMA packet systems for subscribers that communicate in half duplex modes. In one embodiment, a wireless TDMA network element includes at least one processing device and memory, operatively coupled to the processing device that contains executable instructions that when read by at least one processing device causes one or more processing devices to divide an outbound message designated for a first subscriber and produce therefrom an independent first message portion (such as an independent short message) and an independent second message portion (such as an independent longer remaining message). Each of the independent first and second message portions are allocated to two different wireless outbound reservations for a common subscriber. The independent first message is transmitted first. The wireless network element detects whether a collision occurred between an inbound transmission from the first subscriber and the transmitted independent first portion destined for the first subscriber. If a collision is detected, the wireless network element avoids sending the independent second portion to the first subscriber. If a collision is not detected, the network elements sends the independent second message portion for the first subscriber based on the second outbound reservation.

Accordingly, when a half duplex collision occurs, and a subscriber for which an outbound message is destined elects to transmit an inbound reservation request at the very moment that the outbound reservation begins, the outbound message is divided into a short first message and a longer second message wherein the longer message typically includes the remaining portion of the entire message. In this way if a collision occurs, only the short message is lost and needs to be resent. If a collision has not occurred, the network element advertises the actual length of the remaining portion of the second message and continues transmitting slots until the entire message has been sent out. If a collision is detected by the network element, then the inbound reservation is granted to allow the subscriber to transmit to the network element. Subsequently, the next outbound reservation, presumably for a different subscriber, begins and the slots for the subscriber sent as the shorter first message are not discarded but are resent at a later time.

In another embodiment, a method and apparatus for resolving a message collision for a half duplex message collision employs, for example, a TDMA network element that determines if a half duplex collision has occurred. If a collision is detected, the method and network element place collision detection data in a control slot readable by other subscribers. The collision detection data indicates that the outbound message for the subscriber has been terminated due to a collision. The network element stops the transmission of the rest of the outbound message for the subscriber and leaves the message in a message queue for later transmission. If a collision is not detected, the network element continues the transmission of the outbound message for the first subscriber. Accordingly, the message need not be divided into shorter and longer and independent message (however, it may, if desired). Instead, in this embodiment, when a collision has occurred, the control slot is used to abort the outbound reservation, or message so that the next message can be sent and the inbound reservation can be granted. Since all subscribers must monitor the control slot, this solution does not impact the subscriber's battery life. Since the outbound bandwidth used to transmit that portion of the outbound message sent before the control slot is wasted, the solution may provide efficiencies if the control slot frame size is small.

In another embodiment, a combination of the above methodology is employed to divide the outbound message designated for a subscriber into two independent messages, such as a short message and a remaining longer message and detecting whether a collision has occurred between the inbound transmission and the transmitted independent first portion destined for that first subscriber. If a collision has occurred, the network element determines whether the control slot will be sent during the transmission of the independent first message. If a control slot will be sent during a transmission of the independent first message, the network element terminates the transmission of the independent first message and assigns the next slot after the control slot to the following message. Subsequently, the independent first message is retransmitted.

A message as used herein includes any payload (whether data or streaming audio or video information) for a subscriber. However, it is preferable that real time voice information not be deferred as described herein.

FIG. 1 illustrates a block diagram of a wireless TDMA network element 100, such as an FNE, BR or any other suitable wireless network element that includes a wireless transceiver 102 and a processor 104 which may be made up of one or more processing devices such as DSPs, microcontrollers, microprocessors, state machines, dedicated hardware, or any suitable combination of hardware and software. The TDMA network element 100 also includes memory 106 that contains, in this example, programming instructions that when executed by the processor 104 causes the processor 104 to operate in accordance with the following operations. In this example, the processor 104 includes half duplex collision detection and/or message division capabilities as further described below. The transceiver 102 may be any suitable transceiver that allows communication with subscriber units that communicate in a half duplex mode. The below discussion will be made with reference to a wireless TDMA systems such as iDEN, for purposes of illustration only. However, it will be recognized that the disclosed apparatus and methods may be employed in any suitable wireless TDMA system.

Figure 3:
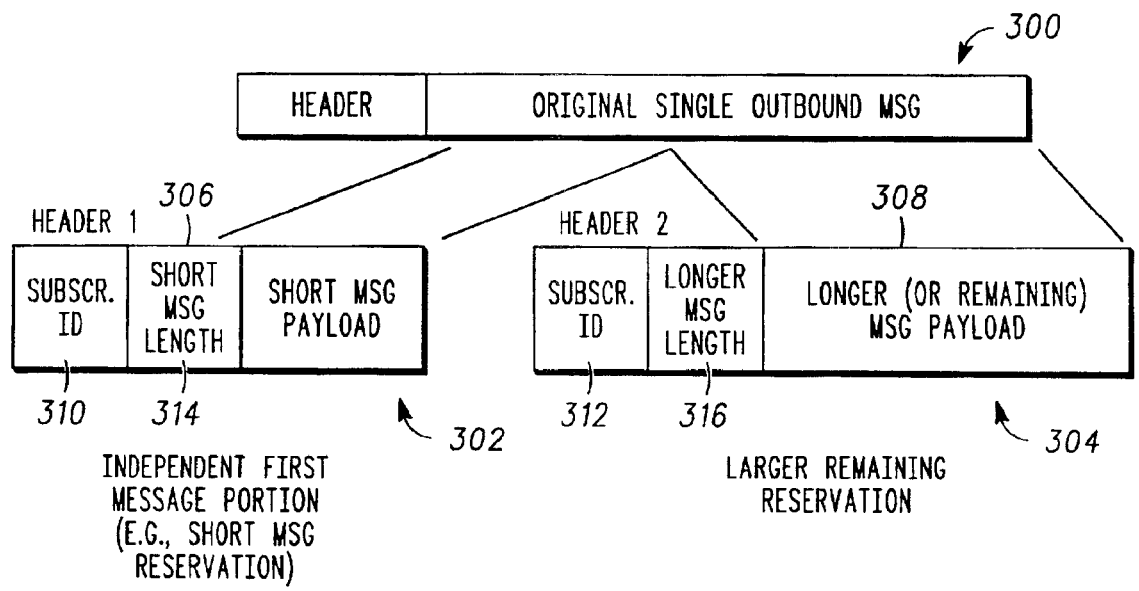
FIG. 3 is a diagram illustrating generation of an independent first message portion and an independent second message portion from an outbound message designated for a subscriber in accordance with one embodiment of the invention.
Figure 2:
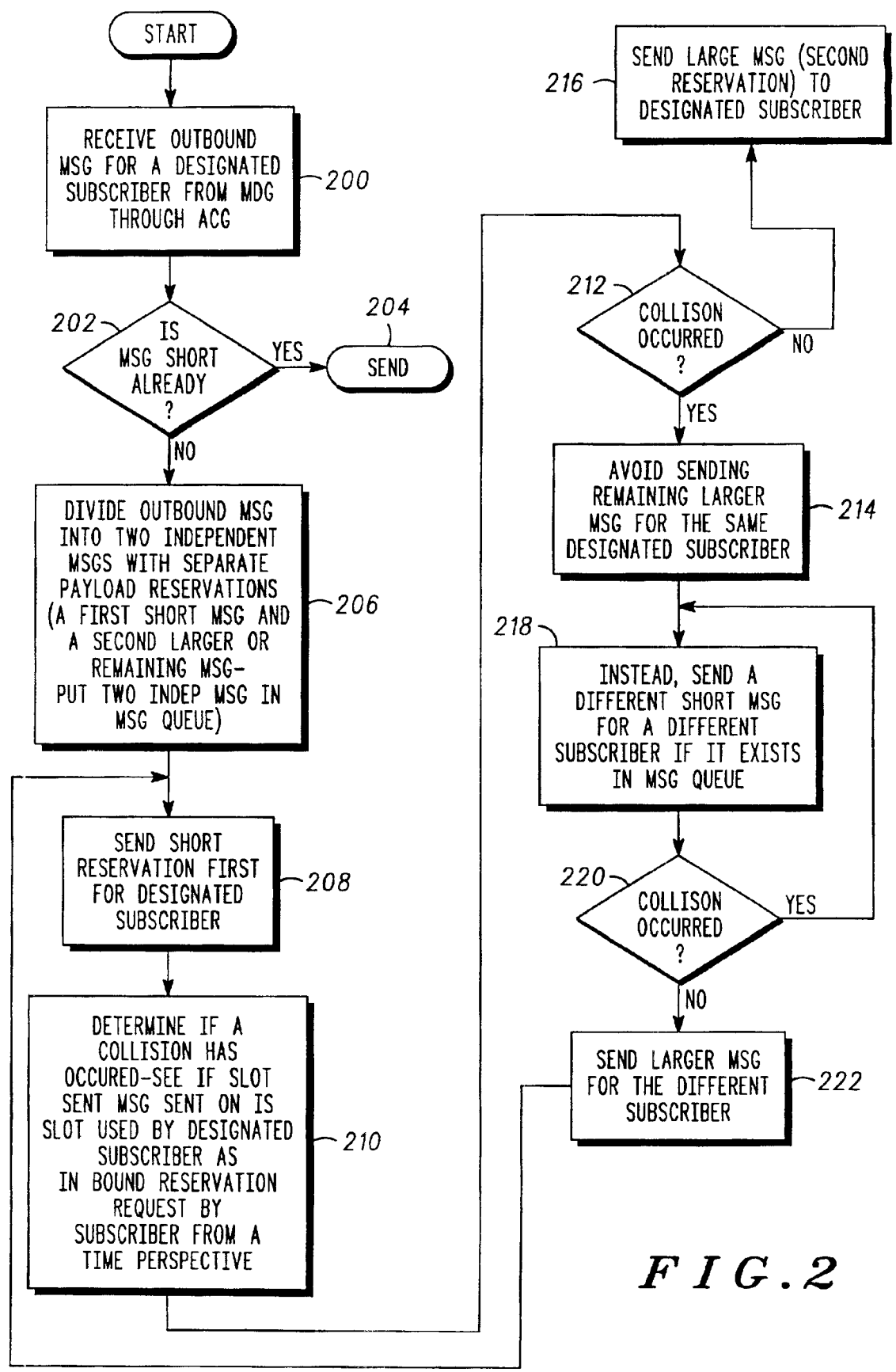
FIG. 2 is a flow chart illustrating one example of a method for resolving a message collision by dividing an outbound message designated for a subscriber into an independent first message portion and an independent second message portion in accordance with one embodiment of the invention.

Referring to FIGS. 2 and 3, one example of the method of operation of the TDMA network element 100 will be described. In this embodiment, a single message designated for a given subscriber is divided into two separate and independent messages, each having their own headers. Preferably, a first independent message is much shorter than a second independent message which preferably contains the remaining portion of the original message. In this way, if a collision is detected, only the short message is lost. It is then subsequently resent along with the second message when a collision is not detected.

As shown in block 200, the method includes the wireless TDMA network 100 receiving an outbound message for a designated subscriber (e.g., subscriber 1) from, for example, a mobile data gateway via an access controller gateway, or from any other suitable source. As shown in block 202, the method includes determining, such as by the TDMA network element 100, the message length of the original message to determine whether the outbound message is already short enough so that it need not be divided into a plurality of independent messages. As shown in block 204, if the outbound message for the designated subscriber is within an acceptable short length (already short enough), the message is transmitted (i.e., sent) via an outbound reservation without any division of the outbound message occurring.

However, if the outbound message 300 for a designated subscriber is longer than a predetermined short length, the method includes dividing the outbound message 300 designated for the subscriber to produce therefrom an independent first message portion 302 and an independent second message portion 304 wherein each of the independent first and second message portions 302 and 304 are allocated to two different wireless outbound reservations. Preferably the dividing of the single outbound message 300 to the two independent messages is done in such a way that the independent first message 302 is a short independent message and the independent second message portion 304 includes any remaining portion (e.g., payload) of the outbound message 300 not included in the short independent message. However, it will be recognized that a single original outbound message 300 may be divided into more than two independent messages if desired. However, it is preferable that the first message portion be much shorter than subsequent message portions so that if a collision is detected, only the shorter message needs to be resent since the subsequent independent messages are not sent until a collision is not apparent. Each of the first and second message portions 302 and 304 includes a header 306 and 308, respectively that each contain a subscriber identifier 310 and 312 respectively. The subscriber identifiers 310 and 312 identify the subscriber for which the original outbound message 300 was destined. Each of the independent message portions 302 and 304 also include message length data 314 and 316, respectively, which represents the length (e.g., number of slots) of the message payload accompanying each independent message. Accordingly, the independent first message portion 302 includes message length data 314 that represents the short independent message length, such as the number of slots of the short message payload and wherein the message length data 316 represents the length of the remaining portion of the outbound message of the second independent message portion 304. The original single outbound message 300 includes a header portion, as known in the art, also identifying, for example, the subscriber and the total length of the original message.

Referring back to FIG. 2, as shown in block 208, the method further includes sending the independent first message portion 302, namely the short independent message, first for the designated subscriber via control of a first outbound reservation. As shown in block 210, the method includes detecting whether the half duplex collision has occurred between an inbound transmission, such as an inbound reservation request by a subscriber, and the transmitted independent first message portion that is destined for the same subscriber. This may be done, for example, by the wireless TDMA network element 100 determining if a slot used by the network element for an outbound message is the slot used by the same designated subscriber as an inbound reservation request from a time perspective. As shown in blocks 212 and 214, if a half duplex collision has occurred, the method includes the TDMA wireless network element avoiding the sending of the independent second message portion (the remaining portion of the original message) to the subscriber. However, if no collision is detected, as shown in block 216, the method includes sending the independent second message portion containing the remaining portion of the original message for the first subscriber based on a second outbound reservation. Accordingly, a single outbound message is divided into two independent messages, namely a shorter and a longer message, each of which are sent based on two different outbound reservations.

However, as shown in block 218, if a collision is detected and the remaining independent second message portion for that designated subscriber is not sent. The method also includes sending a different independent short message portion for a different subscriber if such an independent short message exists in a message queue. For example, when a collision is detected, the network element sends a different independent message portion from another outbound message destined for a different subscriber based on another outbound reservation. Again, if a collision is not detected, the network element sends the remaining message portion in the form of another independent message from the other outbound message for the other subscriber.

Figure 4:
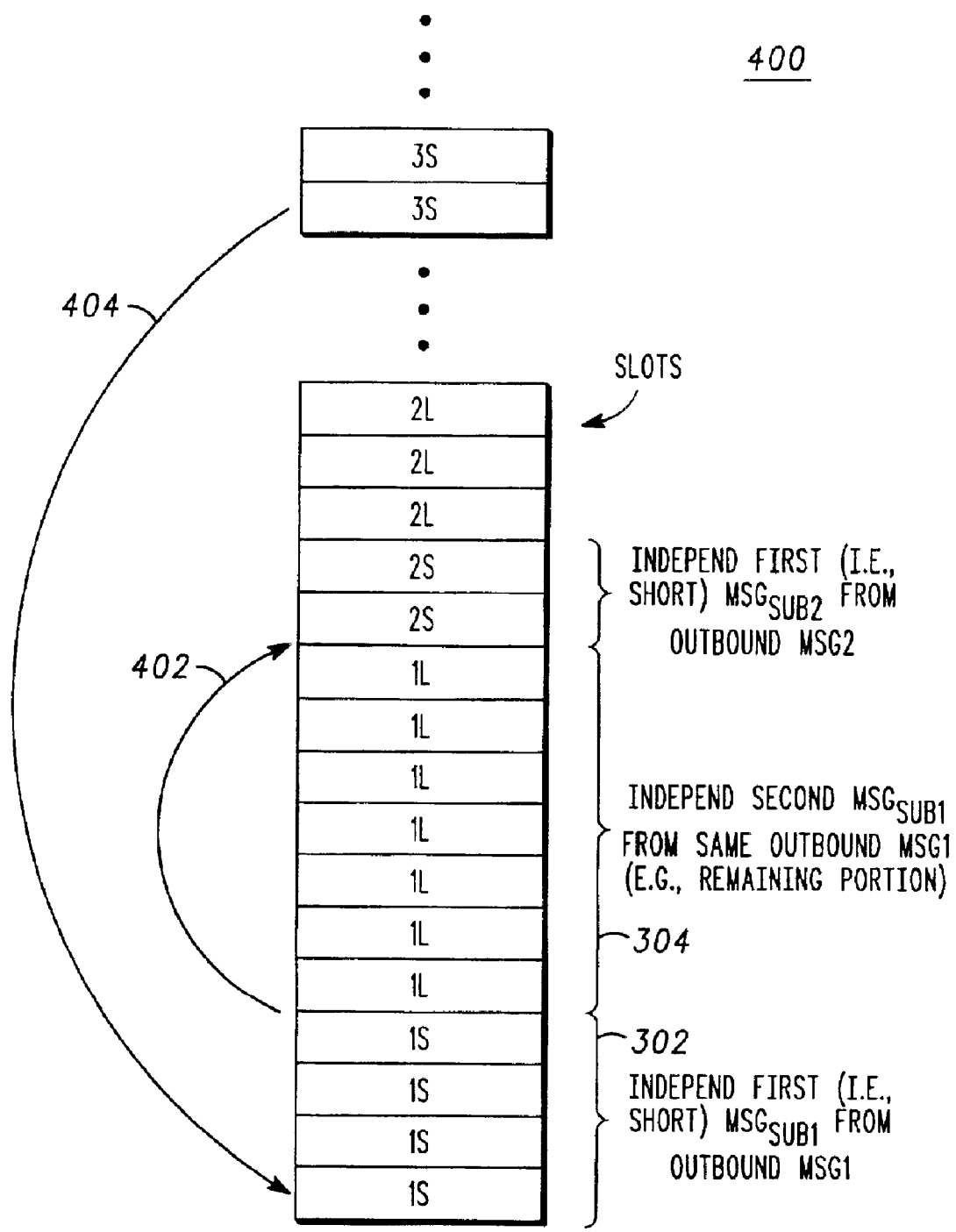
FIG. 4 illustrates an outbound data queue in accordance with one embodiment of the invention.

For example, referring to FIG. 4, a message queue 400 includes the data associated with slots associated with TDMA frames. As shown, the message queue 400 stores data on a per subscriber basis. As shown by line 402, the TDMA network element causes a jump in the message queue 400 if a collision is detected so that the short independent message for another subscriber is sent if a collision is detected when sending the short message of the first subscriber.

Referring to both FIGS. 2 and 4, as shown in block 220, the method includes again determining whether a collision occurred anytime a short independent message is sent. If a collision has been detected, an independent short message associated with a different subscriber is sent since the current independent short message has been corrupted due to a collision. As shown in block 222, if no collision is detected for the independent short message for the different subscriber, the method includes sending the second independent message such as the larger independent message, for the different subscriber. Once the independent messages associated with the other subscriber have been completely sent, the method includes retransmitting the independent short message of the first subscriber that was unable to be properly sent due to the detected collision. Accordingly, the method goes back to step 208. This operation is shown, for example, in FIG. 4, by line 404, wherein both the short and long independent messages for subscriber 2 are sent and a jump occurs in the message queue back to the independent short message or first message associated with subscriber 1. If the short and long independent messages associated with subscriber 1 are sent without collision detection, then the short message associated with subscriber 3 is sent next since the independent short and long messages associated with subscriber 2 went without a collision occurring. However, it will be recognized that any suitable message queuing, storing or ordering operation may be used.

Figure 5:
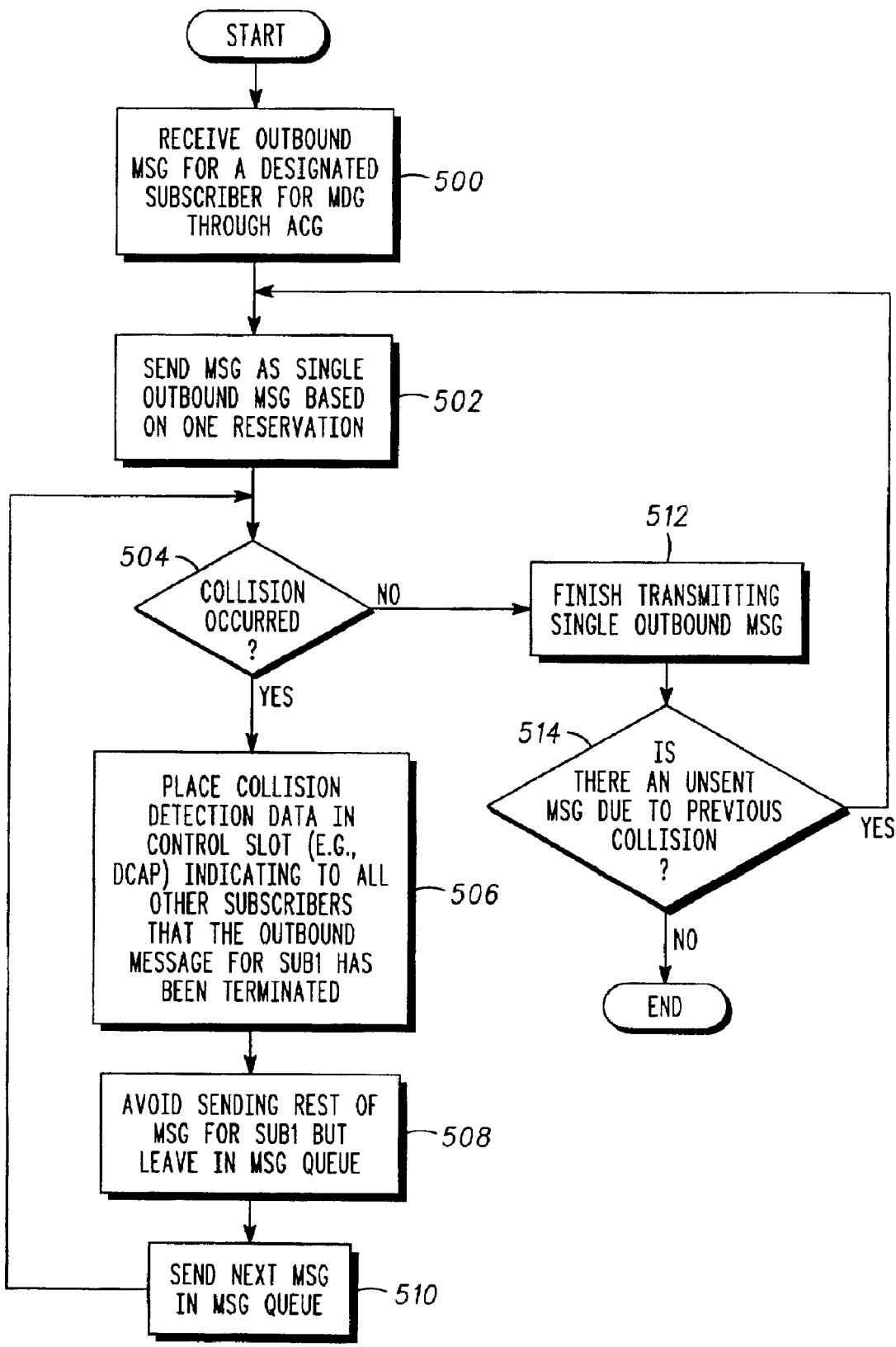
FIG. 5 is a flow chart illustrating one example of a method for resolving a message collision in a half duplex system where collision detection data is placed in a control slot monitored by other subscribers.

FIG. 5 illustrates another embodiment of the invention wherein message division is avoided. Instead, a control slot is used to abort an outbound message when a collision is detected so that the next message bundle can be sent and the inbound reservation requested by the subscriber can be granted. Since all subscribers monitor the control slot, subscriber battery life is not impacted. As shown in block 500, the method includes receiving an outbound message for a designated subscriber from a message source by, for example, the wireless TDMA network element 100. As shown in block 502, instead of dividing the outbound message into independent messages, the network element 100 sends the outbound message as a single outbound message based on a single outbound reservation. For example, the wireless TDMA network element 100 transmits the outbound message designated for the given subscriber. As shown in block 504, the method includes detecting whether a half duplex collision occurred between an inbound transmission for the first subscriber, such as an inbound reservation request, and the transmitted outbound message. This may be done in the same way as described above. As shown in block 506, if a collision is detected the method includes placing, such as by the wireless TDMA network element, collision detection data 600 (see FIG. 6), into a control slot that is read by all subscribers, indicating that the outbound message for the given subscriber has been terminated due to a collision. This may include, for example, bit(s) representing that the current outbound message has been terminated.

As shown in block 508, the method includes avoiding sending the rest of the outbound message for the given subscriber but leaving the message in a message queue. Accordingly, the method includes stopping, such as by the wireless TDMA network element 100, the transmission of the rest of the outbound message and leaving the message in a message queue for later transmission. The method the includes, as shown in block 510, sending the next message in the message queue and determining if a collision has occurred when sending the subsequent message. Half duplex collisions, as noted above, may occur, for example, when the outbound message slot is transmitted for a subscriber at the same time as an inbound reservation request is made by the same subscriber. In this embodiment, the control slot is used to abort the outbound reservation so that the next message can be sent and the inbound reservation can be granted. Since the outbound bandwidth used to transmit the portion of the outbound message sent before the control slot is wasted (due to the collision) this solution may work better if the control slot frame size is relatively small. If there are no collisions, the solution does not unduly impact the throughput of the outbound channel.

Referring back to block 504, if no collision is detected, the method includes continuing the transmission of the outbound message for the subscriber. This is shown in block 512. As shown in block 514, the method includes determining whether there is an unsent outbound message for another subscriber in the message queue due to a previously detected collision. If so, the method includes sending the outbound message in the queue that was originally terminated due to a message collision.

FIG. 7 is a flow chart illustrating another embodiment that effectively combines methodologies described with respect to FIGS. 2 and 5. In this embodiment, the original message is divided into independent messages wherein the short message is sent first as indicated in steps 200 through 208. In step 700, the method includes determining if a collision has occurred for a header of the short independent message. If no collision has occurred, the method includes sending the second independent message to the designated subscriber shown in block 702. However, if a collision has occurred between the slot or slots for the header and an inbound reservation request, for example, the second independent remaining portion is not sent as shown in block 704. However, in addition, the method includes determining if the control slot is coming while the short message is being sent. This is known, for example, by the wireless TDMA network element 100 since it controls when the control slots are being sent as well as when the outbound messages are being sent. This is shown in block 706. After the comparison is made, if it is determined that the control slot will be sent when the short independent message is sent, the method includes also terminating the short message as shown in block 708. As shown in block 710, the method includes assigning the next slots after the control slot to the next message that needs to be sent such as the next short message of another subscriber in the message queue (or resend the same short message for the same subscriber). The process then continues such that a collision detection operation is performed to determine whether the control slot will occur after a collision has already been detected and while the short message portion is being sent.

A method and apparatus has been described that improves messaging due to half duplex collisions. With the embodiment in which a single outbound message is split into two or more independent messages, one being shorter than the others, only a small amount of bandwidth is wasted since only the independent short message would have to be resent. The second remaining portions are not sent if a collision is detected. Other advantages will be recognized by those of ordinary skill in the art. In the instance where the collision detection data is embedded in a control slot, other advantages are apparent such as reducing the battery drain on subscriber units since the information is embedded in a control slot already being read by all the subscribers. Other advantages will also be apparent to those of ordinary skill in the art.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for resolving a message collision for a message transmitted over a wireless TDMA packet channel for a first subscriber communicating in a half duplex mode comprising:

dividing an outbound message designated for the first subscriber and producing therefrom an independent first message portion and an independent second message portion wherein each of the independent first and second message portions are allocated to two different wireless outbound reservations;

first transmitting the independent first message portion based on a first outbound reservation;

detecting whether collision occurred between an inbound transmission from the first subscriber and the transmitted independent first portion destined for the first subscriber; and if a collision is detected, avoid sending the independent second message portion to the first subscriber, otherwise, send the independent second message portion for the first subscriber based on a second outbound reservation.

2. The method of claim 1 including the steps of:

when a collision is detected, sending a third independent message portion from a second outbound message destined for a different subscriber based on another outbound reservation, and sending a fourth independent message portion from the second outbound message for the different subscriber; and then re-transmitting the independent first message portion for the first subscriber.

3. The method of claim 1 including the steps of:

determining a message length of the outbound message;

if the message length is within an acceptable short length, transmitting the outbound message without dividing the outbound message and without producing therefrom the independent first message portion and the independent second message portion.

4. The method of claim 1 wherein the step of dividing the outbound message includes producing a short independent message as the independent first message portion and producing the independent second message portion as including any remaining portion of the outbound message not included in the short independent message portion.

5. The method of claim 4 wherein the independent first message portion includes a first header containing at least a subscriber identifier that identifies the first subscriber and data representing the short independent message length and wherein the independent second message portion includes a second header containing at least the subscriber identifier and data representing a length of the remaining portion of the outbound message.

6. A method for resolving a message collision for a message transmitted over a wireless TDMA packet channel for a first subscriber communicating in a half duplex mode comprising:

transmitting an outbound message designated for the first subscriber;

detecting whether collision occurred between an inbound transmission from the first subscriber and the transmitted outbound message;

if a collision is detected, placing collision detection data in a control slot readable by other subscribers, wherein the collision detection data indicates that the outbound message for the first subscriber has been terminated due to a collision; and stopping the transmission of the rest of the outbound message for the first subscriber, and leaving the message in a message queue for later transmission.

7. The method of claim 6 including the step of:

if a collision is not detected, continuing the transmission of the outbound message for the first subscriber;

determining whether there is a unsent outbound message for another subscriber in a message queue due to a previously detected collision; and if so, sending the unsent outbound message for the other subscriber.

8. The method of claim 6 including the steps of:

dividing the outbound message designated for the first subscriber and producing therefrom an independent first message portion and an independent second message portion wherein each of the independent first and second message portions are allocated to two different wireless outbound reservations;

first transmitting the independent first message portion based on a first outbound reservation;

detecting whether collision occurred between the inbound transmission from the first subscriber and the transmitted independent first portion destined for the first subscriber;

if a collision has occurred, determining whether the control slot will be sent during transmission of the independent first message; and if the control slot will be sent during the transmission of the independent first message, terminating the transmission of the independent first message and assigning the next slot after the control slot to the next message.

9. The method of claim 8 including the steps of:

when a collision is detected, sending a third independent message portion from a second outbound message destined for a different subscriber based on another outbound reservation, and sending a fourth independent message portion from the second outbound message for the different subscriber; and then re-transmitting the independent first message for the first subscriber.

10. The method of claim 8 including the steps of:

determining a message length of the outbound message;

if the message length is within an acceptable short length, transmitting the outbound message without dividing the outbound message and producing therefrom the independent first message portion and the independent second message portion.

11. The method of claim 8 wherein the step of dividing the outbound message includes producing a short independent message as the independent first message portion and producing the independent second message portion as including any remaining portion of the outbound message not included in the short independent message.

12. The method of claim 11 wherein the independent first message portion includes a first header containing at least a subscriber identifier that identifies the first subscriber and data representing the short independent message length, and wherein the independent second message portion includes a second header containing at least the subscriber identifier and data representing a length of the remaining portion of the outbound message.

13. A wireless TDMA network element for resolving a message collision for a message transmitted over a wireless TDMA packet channel for a first subscriber communicating in a half duplex mode comprising:

at least one processing device; and memory, operatively coupled to the processing device, containing executable instructions that when read by the at least one processing device causes the at least one processing device to:

divide an outbound message designated for the first subscriber and producing therefrom an independent first message portion and an independent second message portion wherein each of the independent first and second message portions are allocated to two different wireless outbound reservations;

first transmit the independent first message portion based on a first outbound reservation;

detect whether collision occurred between an inbound transmission from the first subscriber and the transmitted independent first portion destined for the first subscriber; and if a collision is detected, avoid sending the independent second message portion to the first subscriber, otherwise, send the independent second message portion for the first subscriber based on a second outbound reservation.

14. The apparatus of claim 13 wherein the memory contains executable instructions that when read by the at least one processing device causes the at least one processing device to:

when a collision is detected, send a third independent message portion from a second outbound message destined for a different subscriber based on another outbound reservation, and sending a fourth independent message portion from the second outbound message for the different subscriber; and then re-transmit the independent first message for the first subscriber.

15. The apparatus of claim 13 wherein the memory contains executable instructions that when read by the at least one processing device causes the at least one processing device to:

determine a message length of the outbound message; and if the message length is within an acceptable short length, transmit the outbound message without dividing the outbound message and produce therefrom the independent first message portion and the independent second message portion.

16. The apparatus of claim 13 wherein the memory contains executable instructions that when read by the at least one processing device causes the at least one processing device to:

produce a short independent message as the independent first message portion and produce the independent second message portion as including any remaining portion of the outbound message not included in the short independent message.

17. The apparatus of claim 16 wherein the independent first message portion includes a first header containing at least a subscriber identifier that identifies the first subscriber and data representing the short independent message length, and wherein the independent second message portion includes a second header containing at least the subscriber identifier and data representing a length of the remaining portion of the outbound message.

18. A wireless TDMA network element for resolving a message collision for a message transmitted over a wireless TDMA packet channel for a first subscriber communicating in a half duplex mode comprising:

at least one processing device; and memory, operatively coupled to the processing device, containing executable instructions that when read by the at least one processing device causes the at least one processing device to:

transmit an outbound message designated for the first subscriber;

detect whether collision occurred between an inbound transmission from the first subscriber and the transmitted outbound message;

if a collision is detected, place collision detection data in a control slot readable by other subscribers, wherein the collision detection data indicates that the outbound message for the first subscriber has been terminated due to a collision; and stop the transmission of the rest of the outbound message for the first subscriber, and leaving the message in a message queue for later transmission.

19. The apparatus of claim 18 wherein the memory contains executable instructions that when read by the at least one processing device causes the at least one processing device to:

if a collision is not detected, continue the transmission of the outbound message for the first subscriber;

determine whether there is a unsent outbound message for another subscriber in a message queue due to a previously detected collision; and if so, send the unsent outbound message for the other subscriber.

* * * * *